(12) United States Patent
Chen et al.

(10) Patent No.: US 7,996,959 B2
(45) Date of Patent: Aug. 16, 2011

(54) HINGE AND AN ELECTRONIC DEVICE WITH THE HINGE

(75) Inventors: Chia-Hsiang Chen, Shulin (TW); Weiming Chen, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 442 days.

(21) Appl. No.: 12/344,191

(22) Filed: Dec. 24, 2008

(65) Prior Publication Data
US 2010/0154167 A1  Jun. 24, 2010

(51) Int. Cl.
 *E05D 3/10* (2006.01)
(52) U.S. Cl. ............... 16/367; 16/340; 16/334; 16/386
(58) Field of Classification Search ............... 16/367, 16/386, 338–340, 330, 303, 380; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| | | | |
|---|---|---|---|
| 6,256,837 B1 * | 7/2001 | Lan et al. | 16/334 |
| 7,017,235 B2 * | 3/2006 | Lu et al. | 16/367 |
| 7,222,396 B2 * | 5/2007 | Lu et al. | 16/340 |
| 7,380,313 B2 * | 6/2008 | Akiyama et al. | 16/367 |
| 7,603,748 B2 * | 10/2009 | Hsu et al. | 16/367 |
| 7,610,658 B2 * | 11/2009 | Lee et al. | 16/367 |
| 2005/0283949 A1 * | 12/2005 | Lu et al. | 16/367 |
| 2008/0034549 A1 * | 2/2008 | Lee et al. | 16/367 |
| 2008/0034550 A1 * | 2/2008 | Chang et al. | 16/367 |
| 2008/0098566 A1 * | 5/2008 | Chiang et al. | 16/277 |
| 2009/0121094 A1 * | 5/2009 | Chang et al. | 248/125.7 |

FOREIGN PATENT DOCUMENTS

| JP | 2001227229 A | * | 8/2001 |
|---|---|---|---|
| JP | 2004360758 A | * | 12/2004 |

* cited by examiner

*Primary Examiner* — Chuck Y. Mah
(74) *Attorney, Agent, or Firm* — patenttm.us

(57) ABSTRACT

A hinge is mounted between a cover and a base of an electronic device. A lid covers the hinge and is attached securely to the base. The hinge has two cam wings, two tilting shafts and two actuating disks. The tilting shafts are mounted movably through the cam wings. The actuating disks are mounted respectively around the tilting shafts. Each actuating disk has an actuating protrusion sliding along the outer edge of the cam wing. When the cover is pivoted to a certain angle, the actuating protrusions slide at part of the cam wing having larger diameter to gradually lift up the cover so the cover is selectively distant away from the lid. Therefore, the shape of the electronic device does not need to be disfigured and the cover still does not bump against the lid.

16 Claims, 7 Drawing Sheets

US 7,996,959 B2

HINGE AND AN ELECTRONIC DEVICE WITH THE HINGE

BACKGROUND OF THE INVENTION

The present invention relates to a hinge and an electronic device with the hinge, especially to the hinge that is mounted between the cover and the base of the electronic device, and the hinge lifts up the cover while the cover is pivoted.

DESCRIPTION OF THE PRIOR ARTS

With reference to FIGS. 7 and 8, a conventional electronic device, such as a cell phone and a notebook computer, has a base (90, 90A), a cover (92, 92A), a conventional hinge (91, 91A) and a lid (93, 93A). The conventional hinge (91, 91A) is mounted between the base (90, 90A) and the cover (92, 92A) to allow the cover (92, 92A) pivoting relative to the base (90, 90A). The lid (93, 93A) is mounted on the base (90, 90A) and covers the conventional hinge (91, 91A) to ornament the conventional electronic device.

When the cover (92, 92A) is pivoted relative to the base (90, 90A), the lid (93, 93A) interfere with the end of the cover (92, 92A) to keep the cover (92, 92A) from pivoting. To solve the interference between the cover (92, 92A) and the lid (93, 93A), two conventional ways are shown as follows:

One conventional electronic device is shown in FIG. 7. The end of the lid (93) near the cover (92) has an inclined surface (94). The cover (92) is pivoted along the inclined surface (94) so that the lid (93) does not block the cover (92). However, the inclined surface (94) disfigures the entire appearance of the conventional electronic device.

Another conventional electronic device is shown in FIG. 8. A gap is formed between the cover (92A) and the lid (93A). Therefore, the cover (92A) is kept away from the lid (93A) when the cover (92A) is pivoted. However, the gap not only disfigures the appearance of the conventional electronic device but also increase the volume of the conventional electronic device.

Thus, the conventional ways to solve the interference between the cover (92, 92A) and the lid (93, 93A) disfigure the appearance of the conventional electronic device and increase the volume of the conventional electronic device. To disfigure the appearance of the conventional electronic device and to increase the volume of the conventional electronic device are against the need of the market.

To overcome the shortcomings, the present invention provides a hinge and an electronic device with the hinge to mitigate or obviate the aforementioned problems.

SUMMARY OF THE INVENTION

The main objective of the present invention is to provide a hinge and an electronic device with the hinge that lifts up the cover as desired. The hinge is mounted between a cover and a base of the electronic device. A lid covers the hinge and is attached securely to the base. The hinge has two cam wings, two tilting shafts and two actuating disks. The tilting shafts are mounted movably through the cam wings. The actuating disks are mounted respectively around the tilting shafts. Each actuating disk has an actuating protrusion sliding along the outer edge of the cam wing. When the cover is pivoted to a certain angle, the actuating protrusions slide at part of the cam wing having larger diameter to gradually lift up the cover so the cover is selectively distant away from the lid. Therefore, the shape of the electronic device does not need to be disfigured and the cover still does not bump against the lid.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
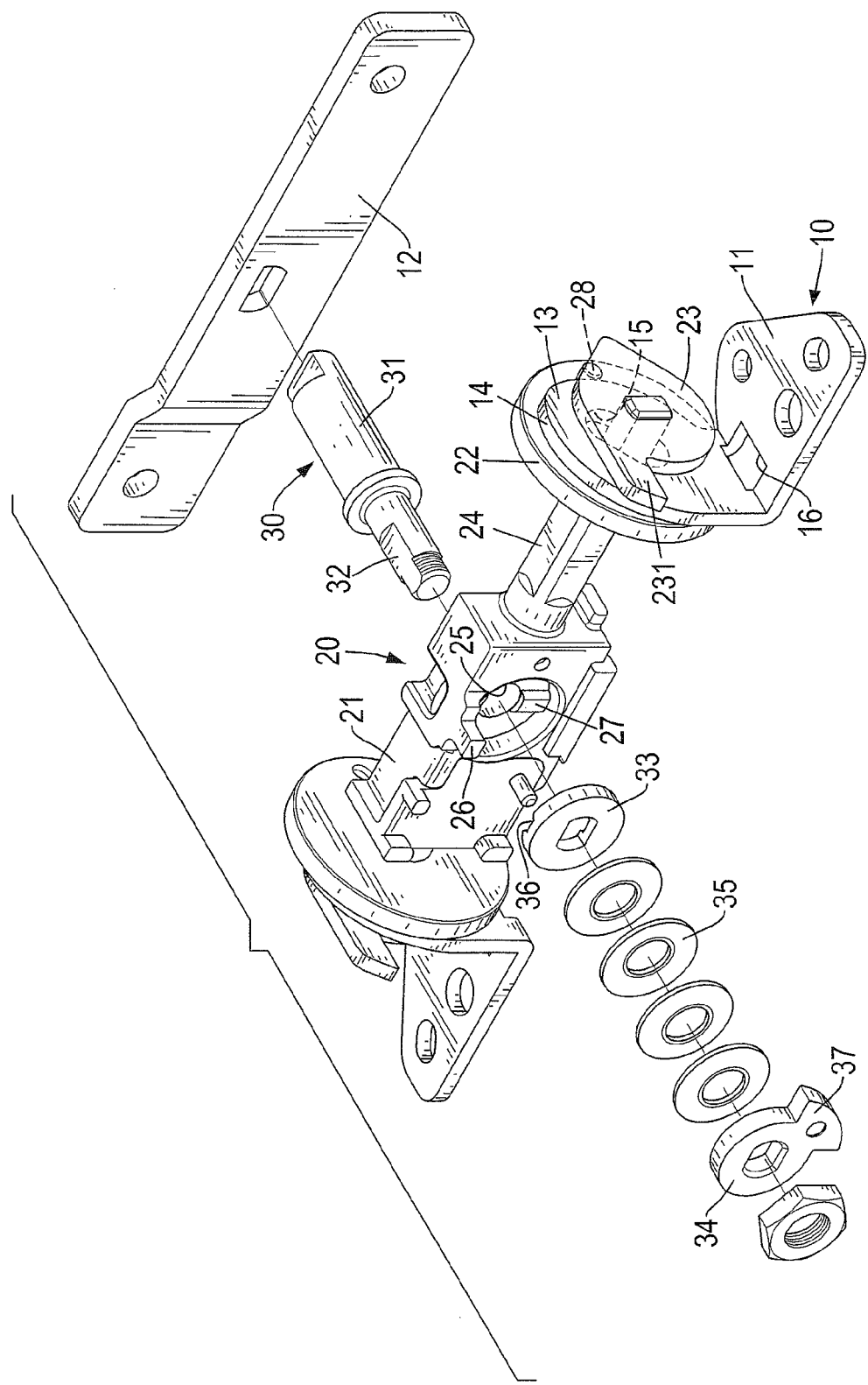
FIG. 1 is a partially exploded perspective view of a hinge in accordance with the present invention.
Figure 2:
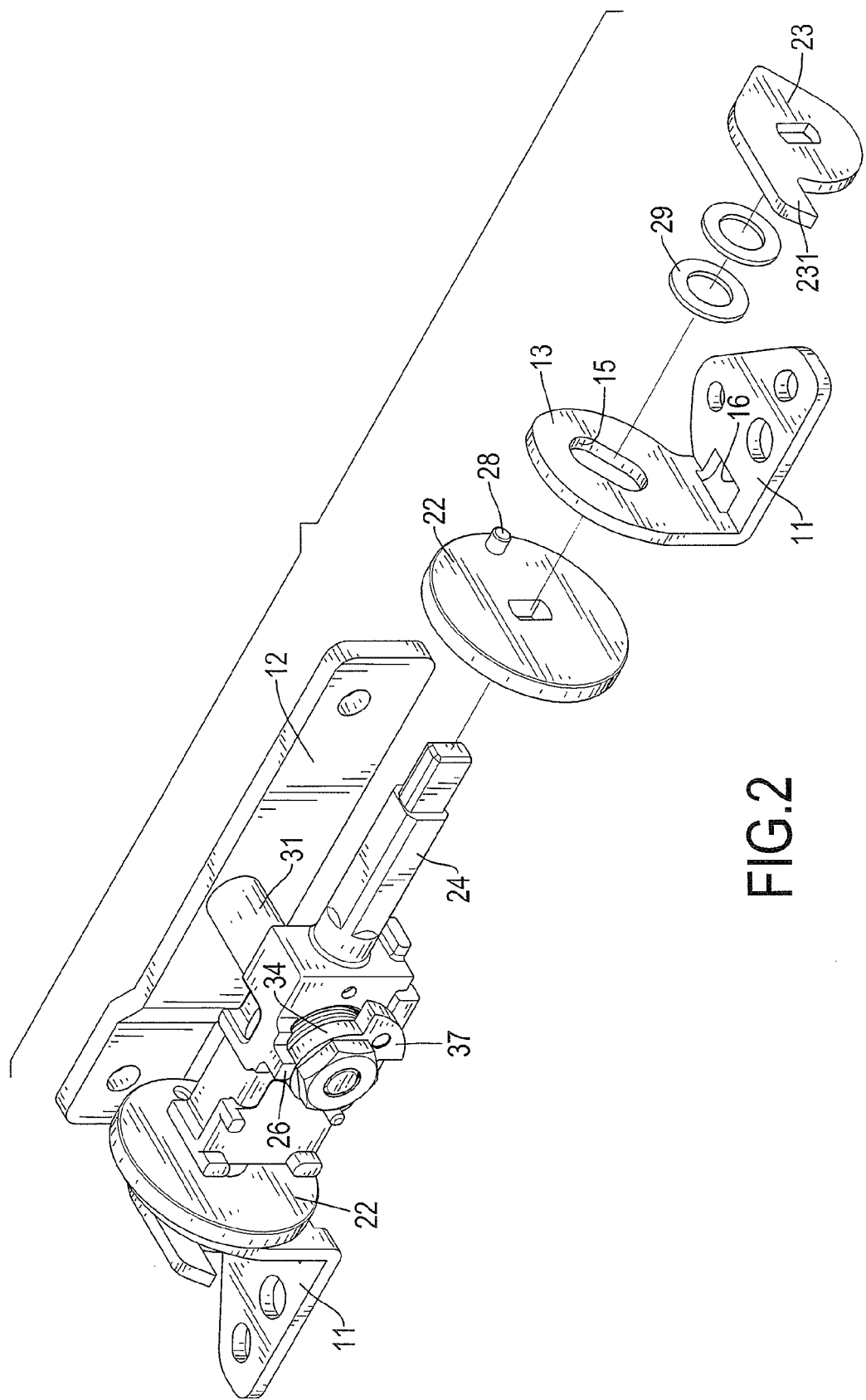
FIG. 2 is another partially exploded perspective view of the hinge in FIG. 1.
Figure 3:
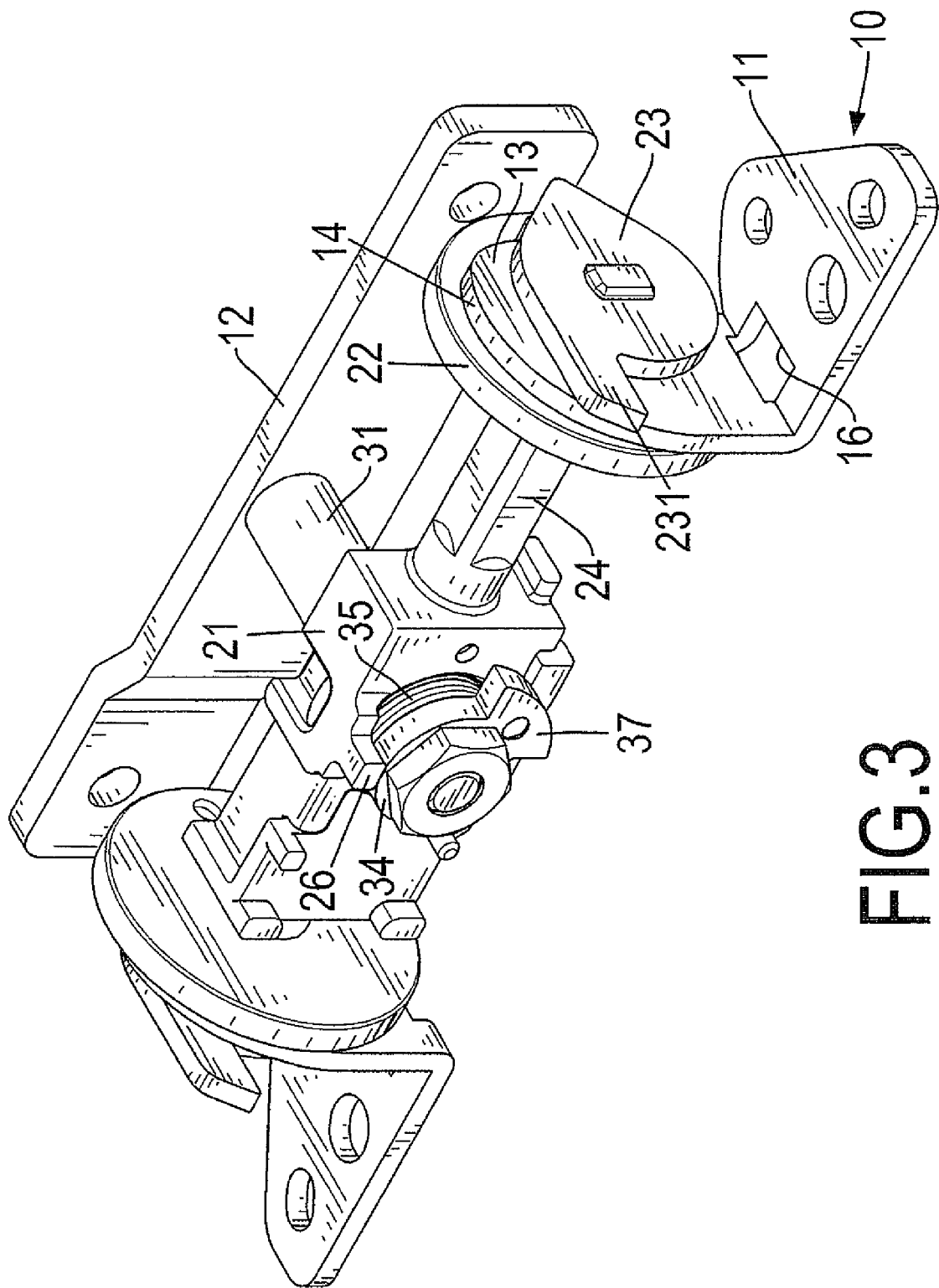
FIG. 3 is a perspective view of the hinge in FIG. 1.

With reference to FIGS. 1 to 3, a hinge in accordance with the present invention comprises a bracket assembly (10), a tilting assembly (20) and a rotating assembly (30).

The bracket assembly (10) has two tilting brackets (11) and a rotating bracket (12).

Each tilting bracket (11) has a mounting wing and a cam wing (13). The mounting wing has a side edge and a limiting recess (16). The limiting recess (16) is formed in the mounting wing near the side edge. The cam wing (13) is formed on the side edge of the mounting wing, may be perpendicular to the mounting wing and has a center, an outer edge (14) and an elongated hole (15). The elongated hole (15) is formed through the cam wing (13). The cam wing (13) has multiple diameters to provide that some parts of the outer edge (14) are at larger diameter and some parts of the outer edge (14) are at smaller diameter.

The tilting assembly (20) is connected to the bracket assembly (10) and comprises a central frame (21), two tilting shafts (24), two actuating disks (22), multiple rubbing washers (29) and two fastening rings (23).

The central frame (21) is mounted between tilting brackets (11) and has a first end, a second end, a first side, a second side, a mounting hole (25), a limiting protrusion (26) and two positioning protrusions (27). The second end is opposite to the first end. The second side is opposite to the first side and is adjacent to the first and second ends. The mounting hole (25) is formed through the first and second sides of the central frame (21). The limiting protrusion (26) is formed on and protrudes longitudinally from the second side. The positioning protrusions (27) are formed on the second side and are adjacent to the mounting hole (25).

The tilting shafts (24) are formed respectively on and protrude transversely from the first and second ends of the central frame (21) and are mounted respectively and movably through the elongated holes (15) of the tilting brackets (11). Each tilting shaft (24) has a non-circular shape in cross section.

The actuating disks (22) is mounted respectively around the tilting shafts (24). Each actuating disk (22) has an abutting surface, an actuating protrusion (28) and a central hole configured to match the shape of the corresponding tilting shaft (24). The abutting surface of the actuating disk (22) abuts the cam wing (13) of the corresponding tilting bracket (11). The actuating protrusion (28) is formed on the abutting surface of the actuating disk (22) and slides along the outer edge (14) of the cam wing (13) of the corresponding tilting bracket (11).

The rubbing washers (29) are mounted around the tilting shafts (24).

The fastening rings (23) are fastened respectively on the tilting shafts (24) and respectively correspond to the mounting wings of the tilting brackets (11). Each fastening ring (23) has an annular edge and a limiting protrusion (231). The limiting protrusion (231) is formed transversely on the annular edge of the fastening ring (23) and selectively abuts the limiting recess (16) of the mounting wing of the corresponding tilting bracket (11) to limit the rotating angle of the tilting shaft (24).

The rotating assembly (30) is connected to the tilting assembly (20) and comprises a rotating shaft (31), a positioning washer (33), multiple resilient washers (35), a limiting ring (34) and a fastening ring.

The rotating shaft (31) is longitudinally mounted rotatably through the central frame (21), is preferably mounted rotatably through the mounting hole (25) of the central frame (21), is attached securely to the rotating bracket (12) and has a mounting part (32). The mounting part (32) has a non-circular shape in cross section and protrudes through the second side of the central frame (21) and may have a threaded outer wall.

The positioning washer (33) is mounted slidably around the mounting part (32) of the rotating shaft (31) and has an abutting surface, two positioning recesses (36) and a central hole configured to match the shape of the mounting part (32) of the rotating shaft (31). The abutting surface of the positioning washer (33) faces the second side of the central frame (21). The positioning recesses (36) are formed in the abutting surface of the positioning washer (33) and selectively engage the positioning protrusions (27) of the central frame (21) to provide positioning function.

The resilient washers (35) are mounted around the mounting part (32) of the rotating shaft (31) and abut the positioning washer (33).

The limiting ring (34) is mounted around the mounting part (32) of the rotating shaft (31) and has an annular edge, a limiting protrusion (37) and a central hole configured to match the shape of the mounting part (32) of the rotating shaft (31). The limiting protrusion (37) is formed transversely on the annular edge of the limiting ring (34) and selectively abuts the limiting protrusion (26) of the central frame (21) to limit the rotating angle of the rotating shaft (31).

The fastening ring is mounted securely around the mounting part (32) of the rotating shaft (31) to hold the limiting ring (34), the resilient washers (35) and the positioning washer (33) and may be a nut being screwed onto the threaded outer wall of the mounting part (32).

Figure 4:
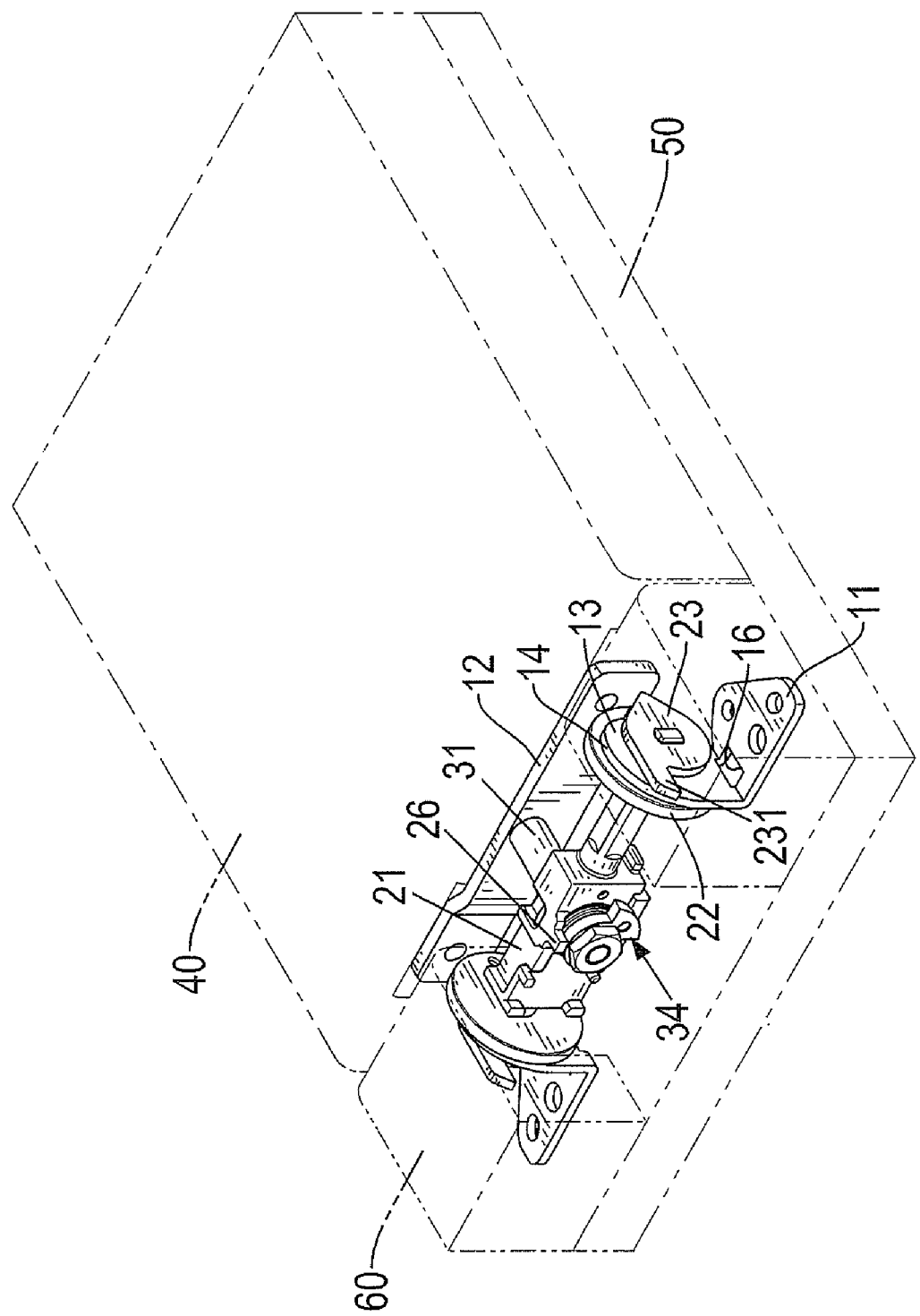
FIG. 4 is a perspective view of an electronic device in accordance with the present invention with the hinge in FIG. 1.
Figure 5:
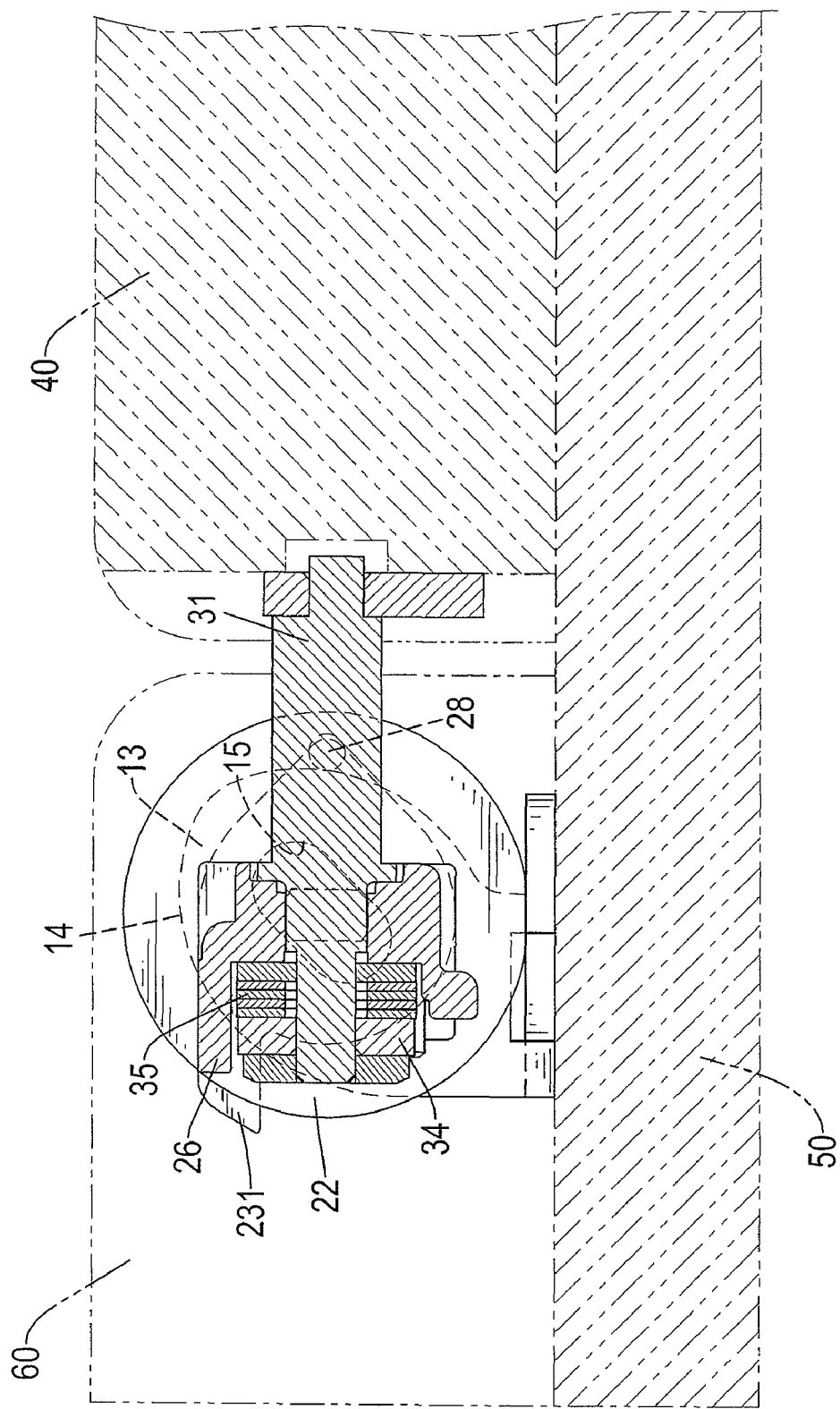
FIG. 5 is an enlarged side view in partial section of the electronic device in FIG. 4.

With further reference to FIGS. 4 and 5, an electronic device in accordance with the present invention comprises a cover (40), a base (50), a hinge as described and a lid (60). The cover (40) is connected pivotally to the base (50). The hinge as described is mounted between the cover (40) and the base (50). The rotating shaft (31) is connected securely to the cover (40) or the rotating bracket (12) may be attached securely to the cover (40). The tilting brackets (11) are attached securely to the base (50). The lid (60) covers the hinge as described and is attached securely to the base (50).

Figure 6A:
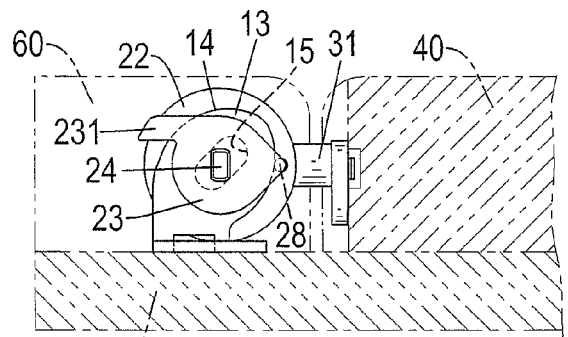
FIGS. 6*a*, 6*b* and 6*c* are operational side views in partial section of the electronic device in FIG. 4.
Figure 6B:
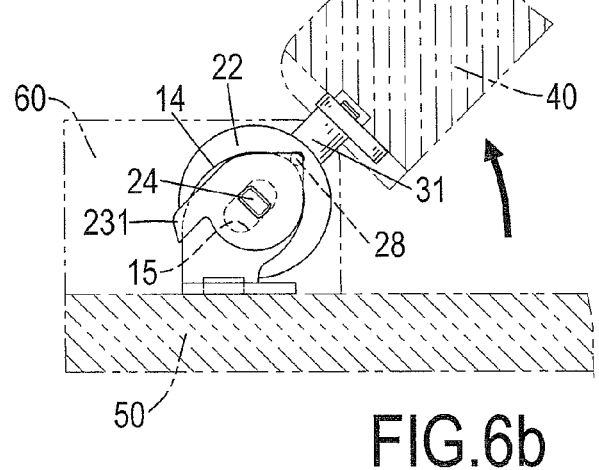
Figure 6:
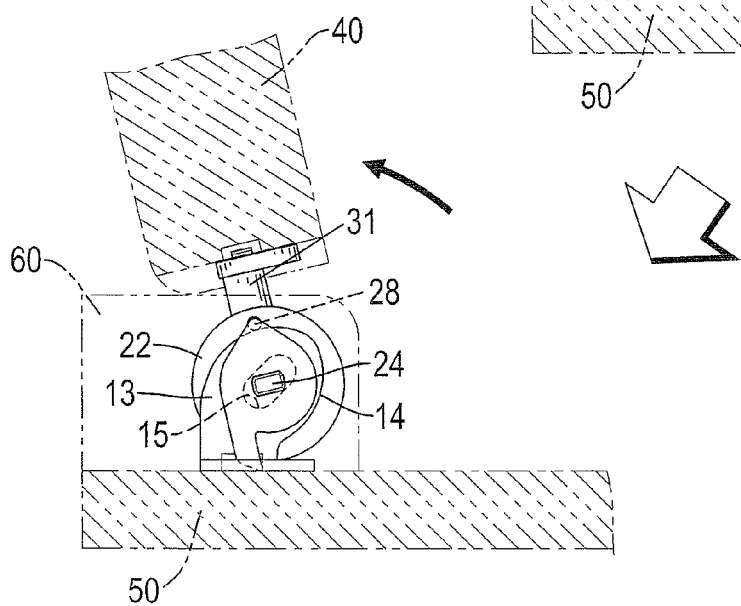
Figure 7:
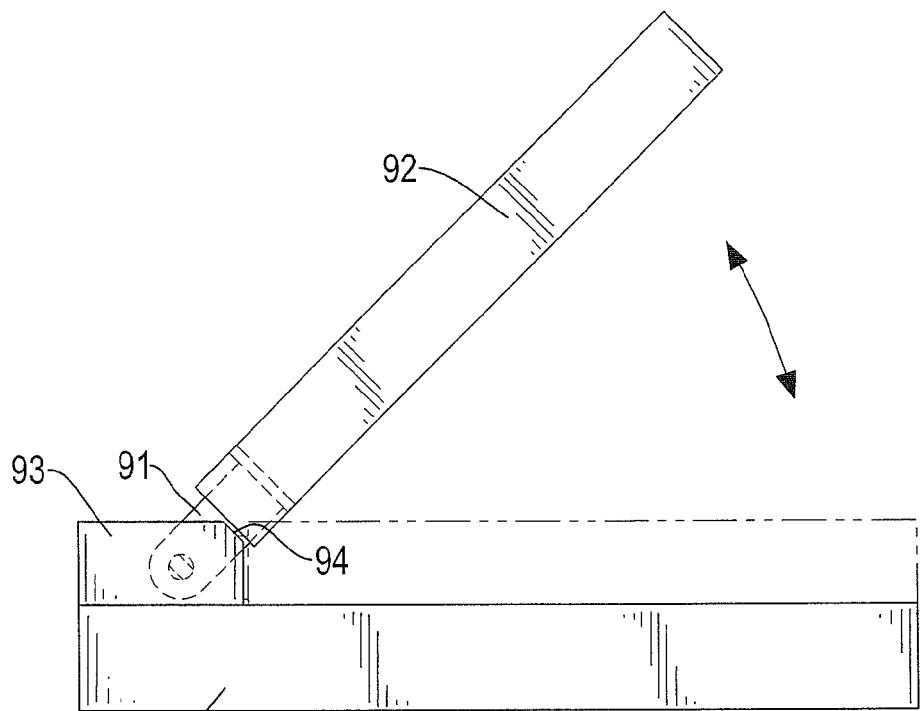
FIG. 7 is an operational side view of a conventional electronic device in accordance with the prior art.
Figure 8:
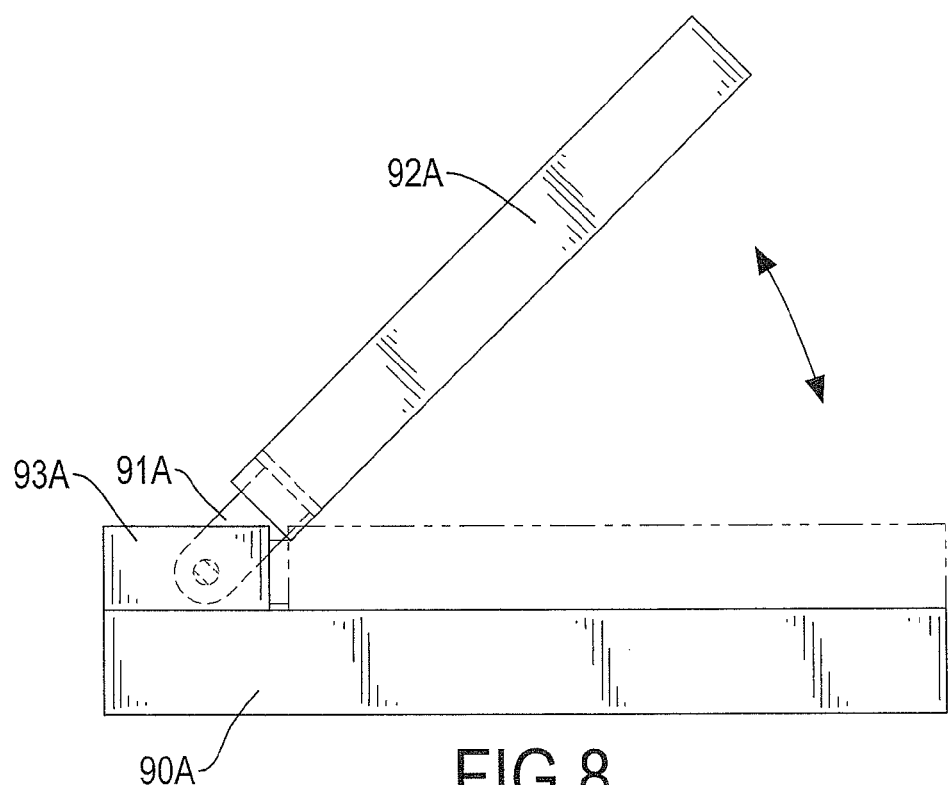
FIG. 8 is an operational side view of another conventional electronic device in accordance with the prior art.

With further reference to FIGS. 6a, 6b and 6c, the cover (40) is pivoted relative to the base (50). The cover (40) brings the rotating shaft (31) and the central frame (21) to pivot relative to the tilting brackets (11). The actuating disks (22) are rotated with the tilting shafts (24) and the actuating protrusions (28) respectively slide along the outer edges (14) of the cam wings (13). When the actuating protrusions (28) reach the parts of the outer edge (14) at larger diameter part of the cam wing (13), the tilting shafts (24) respectively slide in the elongated holes (15) of the cam wings (13) to gradually lift up the cover (40). Because the cover (40) is lifted up to be distant from the lid (60), the cover (40) does not bump against the lid (60) when the cover (40) is pivoted.

The hinge and the electronic device as described have following advantages. The hinge smoothly lifts the cover (40) up when the cover (40) is pivoted to a certain angle. Therefore, the shape of the electronic device does not need to be disfigured and the cover (40) still does not bump against the lid (60). Furthermore, the electronic device as described can be sized small and can be shaped exquisitely without influence the smoothness when the cover (40) is pivoted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
    a bracket assembly having two tilting brackets, and each tilting bracket having
        a mounting wing having a side edge; and
        a cam wing being formed on the side edge of the mounting wing and having
            an outer edge; and
            an elongated hole being formed through the cam wing;
    a tilting assembly being connected to the bracket assembly and comprising
        a central frame being mounted between said tilting brackets and having
            a first end;
            a second end being opposite to the first end;
            a first side; and
            a second side being opposite to the first side and adjacent to the first and second ends;
        two tilting shafts being formed respectively on and protruding transversely from the first and second ends of the central frame and being mounted respectively and movably through the elongated holes of the tilting brackets, and each tilting shaft having a non-circular shape in cross section;
        two actuating disks being mounted respectively around the tilting shafts, and each actuating disk having
            an abutting surface abutting the cam wing of a corresponding tilting bracket;
            an actuating protrusion being formed on the abutting surface of the actuating disk and sliding along the outer edge of the cam wing of a corresponding tilting bracket; and
            a central hole configured to match the shape of the corresponding tilting shaft; and
        two fastening rings being fastened respectively on the tilting shafts and respectively corresponding to the mounting wings of the tilting brackets; and a rotating assembly being connected to the tilting assembly and comprising a rotating shaft being longitudinally mounted rotatably through the central frame.

2. The hinge as claimed in claim 1, wherein the rotating assembly has a rotating bracket being attached securely to the rotating shaft of the rotating assembly.

3. The hinge as claimed in claim 2, wherein
the central frame of the tilting assembly has
   a mounting hole being formed through the first and second sides of the central frame;
   a limiting protrusion being formed on and protrudes longitudinally from the second side of the central frame; and
   two positioning protrusions being formed on the second side and adjacent to the mounting hole;
the rotating shaft of the rotating assembly has a mounting part having a non-circular shape in cross section and protruding through the second side of the central frame; and
the rotating assembly has
   a positioning washer being mounted slidably around the mounting part of the rotating shaft and having
      an abutting surface facing the second side of the central frame;
      two positioning recesses being formed in the abutting surface of the positioning washer and selectively engaging the positioning protrusions of the central frame; and
      a central hole configured to match the shape of the mounting part of the rotating shaft;
   multiple resilient washers being mounted around the mounting part of the rotating shaft and abutting the positioning washer;
   a limiting ring being mounted around the mounting part of the rotating shaft and having
      an annular edge;
      a limiting protrusion being formed transversely on the annular edge of the limiting ring and selectively abutting the limiting protrusion of the central frame; and
      a central hole configured to match the shape of the mounting part of the rotating shaft; and
   a fastening ring being mounted securely around the mounting part of the rotating shaft.

4. The hinge as claimed in claim 3, wherein
the mounting wing of each tilting bracket has a limiting recess being formed in the mounting wing near the side edge of the mounting wing; and
each fastening ring of the tilting assembly has
   an annular edge; and
   a limiting protrusion being formed transversely on the annular edge of the fastening ring and selectively abutting the limiting recess of the mounting wing of a corresponding tilting bracket.

5. The hinge as claimed in claim 4, wherein the tilting assembly has multiple rubbing washers being mounted around the tilting shafts.

6. The hinge as claimed in claim 1, wherein
the central frame of the tilting assembly has
   a mounting hole being formed through the first and second sides of the central frame;
   a limiting protrusion being formed on and protrudes longitudinally from the second side of the central frame; and
   two positioning protrusions being formed on the second side and adjacent to the mounting hole;

the rotating shaft of the rotating assembly has a mounting part having a non-circular shape in cross section and protruding through the second side of the central frame; and
the rotating assembly has
   a positioning washer being mounted slidably around the mounting part of the rotating shaft and having
      an abutting surface facing the second side of the central frame;
      two positioning recesses being formed in the abutting surface of the positioning washer and selectively engaging the positioning protrusions of the central frame; and
      a central hole configured to match the shape of the mounting part of the rotating shaft;
   multiple resilient washers being mounted around the mounting part of the rotating shaft and abutting the positioning washer;
   a limiting ring being mounted around the mounting part of the rotating shaft and having
      an annular edge;
      a limiting protrusion being formed transversely on the annular edge of the limiting ring and selectively abutting the limiting protrusion of the central frame; and
      a central hole configured to match the shape of the mounting part of the rotating shaft; and
   a fastening ring being mounted securely around the mounting part of the rotating shaft.

7. The hinge as claimed in claim 1, wherein
the mounting wing of each tilting bracket has a limiting recess being formed in the mounting wing near the side edge of the mounting wing; and
each fastening ring of the tilting assembly has
   an annular edge; and
   a limiting protrusion being formed transversely on the annular edge of the fastening ring and selectively abutting the limiting recess of the mounting wing of a corresponding tilting bracket.

8. The hinge as claimed in claim 1, wherein the tilting assembly has multiple rubbing washers being mounted around the tilting shafts.

9. An electronic device comprising:
a base;
a cover being connected pivotally to the base;
a hinge being connected between the base and the cover and comprising
   a bracket assembly having two tilting brackets being attached securely to the base, and each tilting bracket having
      a mounting wing having a side edge; and
      a cam wing being formed on the side edge of the mounting wing and having
         an outer edge; and
         an elongated hole being formed through the cam wing;
   a tilting assembly being connected to the bracket assembly and comprising
      a central frame being mounted between said tilting brackets and having
         a first end;
         a second end being opposite to the first end;
         a first side; and
         a second side being opposite to the first side and adjacent to the first and second ends;
      two tilting shafts being formed respectively on and protruding transversely from the first and second ends of the central frame and being mounted respectively and movably through the elongated holes of the tilting brackets, and each tilting shaft having a non-circular shape in cross section;

two actuating disks being mounted respectively around the tilting shafts, and each actuating disk having
- an abutting surface abutting the cam wing of a corresponding tilting bracket;
- an actuating protrusion being formed on the abutting surface of the actuating disk and sliding along the outer edge of the cam wing of a corresponding tilting bracket; and
- a central hole configured to match the shape of the corresponding tilting shaft; and two fastening rings being fastened respectively on the tilting shafts and respectively corresponding to the mounting wings of the tilting brackets; and a rotating assembly being connected to the tilting assembly and comprising a rotating shaft being longitudinally mounted rotatably through the central frame and being connected securely to the cover; and a lid covering the hinge and being attached securely to the base.

10. The electronic device as claimed in claim 9, wherein the rotating assembly has a rotating bracket being attached securely to the rotating shaft of the rotating assembly and being attached securely to the cover.

11. The electronic device as claimed in claim 10, wherein the central frame of the tilting assembly has
- a mounting hole being formed through the first and second sides of the central frame;
- a limiting protrusion being formed on and protrudes longitudinally from the second side of the central frame; and
- two positioning protrusions being formed on the second side and adjacent to the mounting hole;

the rotating shaft of the rotating assembly has a mounting part having a non-circular shape in cross section and protruding through the second side of the central frame; and the rotating assembly has
- a positioning washer being mounted slidably around the mounting part of the rotating shaft and having
    - an abutting surface facing the second side of the central frame;
    - two positioning recesses being formed in the abutting surface of the positioning washer and selectively engaging the positioning protrusions of the central frame; and
    - a central hole configured to match the shape of the mounting part of the rotating shaft;
- multiple resilient washers being mounted around the mounting part of the rotating shaft and abutting the positioning washer;
- a limiting ring being mounted around the mounting part of the rotating shaft and having
    - an annular edge;
    - a limiting protrusion being formed transversely on the annular edge of the limiting ring and selectively abutting the limiting protrusion of the central frame; and
    - a central hole configured to match the shape of the mounting part of the rotating shaft; and
- a fastening ring being mounted securely around the mounting part of the rotating shaft.

12. The electronic device as claimed in claim 11, wherein the mounting wing of each tilting bracket has a limiting recess being formed in the mounting wing near the side edge of the mounting wing; and each fastening ring of the tilting assembly has
- an annular edge; and
- a limiting protrusion being formed transversely on the annular edge of the fastening ring and selectively abutting the limiting recess of the mounting wing of a corresponding tilting bracket.

13. The electronic device as claimed in claim 12, wherein the tilting assembly has multiple rubbing washers being mounted around the tilting shafts.

14. The electronic device as claimed in claim 9, wherein the central frame of the tilting assembly has
- a mounting hole being formed through the first and second sides of the central frame;
- a limiting protrusion being formed on and protrudes longitudinally from the second side of the central frame; and
- two positioning protrusions being formed on the second side and adjacent to the mounting hole;

the rotating shaft of the rotating assembly has a mounting part having a non-circular shape in cross section and protruding through the second side of the central frame; and the rotating assembly has
- a positioning washer being mounted slidably around the mounting part of the rotating shaft and having
    - an abutting surface facing the second side of the central frame;
    - two positioning recesses being formed in the abutting surface of the positioning washer and selectively engaging the positioning protrusions of the central frame; and
    - a central hole configured to match the shape of the mounting part of the rotating shaft;
- multiple resilient washers being mounted around the mounting part of the rotating shaft and abutting the positioning washer;
- a limiting ring being mounted around the mounting part of the rotating shaft and having
    - an annular edge;
    - a limiting protrusion being formed transversely on the annular edge of the limiting ring and selectively abutting the limiting protrusion of the central frame; and
    - a central hole configured to match the shape of the mounting part of the rotating shaft; and
- a fastening ring being mounted securely around the mounting part of the rotating shaft.

15. The electronic device as claimed in claim 9, wherein the mounting wing of each tilting bracket has a limiting recess being formed in the mounting wing near the side edge of the mounting wing; and each fastening ring of the tilting assembly has
- an annular edge; and
- a limiting protrusion being formed transversely on the annular edge of the fastening ring and selectively abutting the limiting recess of the mounting, wing of a corresponding tilting bracket.

16. The electronic device as claimed in claim 9, wherein the tilting assembly has multiple rubbing washers being mounted around the tilting shafts.

\* \* \* \* \*